(12) United States Patent  (10) Patent No.: US 9,197,784 B2
Hasegawa  (45) Date of Patent: Nov. 24, 2015

(54) PRINTING DEVICE CAPABLE OF DISPLAYING THUMBNAIL IMAGE OF MOTION IMAGE FILE

(75) Inventor: Tomohiko Hasegawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 353 days.

(21) Appl. No.: 12/626,165

(22) Filed: Nov. 25, 2009

(65) Prior Publication Data

US 2010/0134835 A1   Jun. 3, 2010

(30) Foreign Application Priority Data

Nov. 28, 2008 (JP) ................................. 2008-304805

(51) Int. Cl.
G06K 15/00 (2006.01)
H04N 1/387 (2006.01)
G11B 27/34 (2006.01)
H04N 1/00 (2006.01)

(52) U.S. Cl.
CPC ........... *H04N 1/387* (2013.01); *H04N 1/00297* (2013.01); *H04N 1/00442* (2013.01); *H04N 1/00448* (2013.01); *H04N 1/00453* (2013.01); *H04N 1/00458* (2013.01); *H04N 1/00461* (2013.01); *G11B 27/34* (2013.01); *H04N 1/00283* (2013.01); *H04N 2201/0094* (2013.01)

(58) Field of Classification Search
USPC ................... 348/14.07, 333.05, 345; 358/1.1; 382/254; 715/716; 353/122
See application file for complete search history.

(56) References Cited

U.S. PATENT DOCUMENTS

| 5,404,316 | A | * | 4/1995 | Klingler et al. ................ 715/723 |
| 5,689,610 | A | * | 11/1997 | Manico et al. ................ 386/200 |
| 5,706,097 | A | * | 1/1998 | Schelling et al. ............. 358/296 |
| 5,963,204 | A | | 10/1999 | Ikeda et al. |
| 6,028,603 | A | | 2/2000 | Wang et al. |
| 6,453,078 | B2 | | 9/2002 | Bubie et al. |
| 6,456,391 | B1 | * | 9/2002 | Miyamoto et al. ........... 358/1.18 |
| 6,456,779 | B1 | | 9/2002 | Saib |

(Continued)

FOREIGN PATENT DOCUMENTS

EP 1973328 A1 9/2008
JP H01-081574 3/1989

(Continued)

OTHER PUBLICATIONS

Extended European Search Report dated Nov. 5, 2010.

(Continued)

*Primary Examiner* — Ted Barnes
(74) *Attorney, Agent, or Firm* — Scully, Scott, Murphy & Presser P.C.

(57) ABSTRACT

A printing device having a retrieving unit to retrieve an image file representing a motion image, a generating unit to extract a plurality of frame images from the image file and generate a first output image in which the plurality of extracted frame images are laid out on a single page. A displaying unit displays the first output image having the plurality of extracted frame images. The plurality of extracted frame images are displayed each at a size larger than a size of the frame image laid out in the first output image and each at a time different from one another and different from a time when the displaying unit displays the first output image. A printing unit prints the first output image having the plurality of extracted frame images.

16 Claims, 12 Drawing Sheets

(56) References Cited

U.S. PATENT DOCUMENTS

| | | | |
|---|---|---|---|
| 6,657,637 B1* | 12/2003 | Inagaki et al. | 345/629 |
| 6,701,011 B1* | 3/2004 | Nakajima | 382/167 |
| 6,795,212 B1 | 9/2004 | Ichikawa | |
| 6,807,361 B1 | 10/2004 | Girgensohn et al. | |
| 6,816,552 B2 | 11/2004 | Demos | |
| 6,903,760 B2 | 6/2005 | Wefringhaus et al. | |
| 6,945,716 B2* | 9/2005 | Kawamoto | 400/62 |
| 7,145,601 B2 | 12/2006 | Misawa et al. | |
| 7,196,727 B2* | 3/2007 | Sato | 348/333.11 |
| 7,266,150 B2 | 9/2007 | Demos | |
| 7,277,192 B2* | 10/2007 | Kotani et al. | 358/1.13 |
| 7,313,280 B2 | 12/2007 | Murai et al. | |
| 7,447,992 B2 | 11/2008 | Kawabata | |
| 7,495,795 B2* | 2/2009 | Graham et al. | 358/1.18 |
| 7,511,849 B2* | 3/2009 | Matsuhira | 358/1.15 |
| 7,540,011 B2* | 5/2009 | Wixson et al. | 725/52 |
| 7,656,451 B2* | 2/2010 | Yanagi | 348/333.11 |
| 7,720,349 B2* | 5/2010 | Ogikubo | 386/278 |
| 7,760,956 B2* | 7/2010 | Lin et al. | 382/254 |
| 7,839,512 B2 | 11/2010 | Kotani et al. | |
| 7,911,511 B2* | 3/2011 | Yoshikawa et al. | 348/231.99 |
| 7,954,056 B2* | 5/2011 | Graham | 715/716 |
| 8,040,551 B2* | 10/2011 | Ono et al. | 358/1.18 |
| 8,094,990 B2* | 1/2012 | Ichikawa | 386/200 |
| 8,149,286 B2 | 4/2012 | Takagi et al. | |
| 8,150,194 B2 | 4/2012 | Fujibayashi et al. | |
| 8,185,842 B2* | 5/2012 | Chang et al. | 715/776 |
| 8,249,397 B2* | 8/2012 | Wood et al. | 382/305 |
| 8,311,393 B2* | 11/2012 | Kawaoka | 386/288 |
| 8,332,757 B1 | 12/2012 | Davey et al. | |
| 2002/0048043 A1 | 4/2002 | Takahashi et al. | |
| 2002/0126318 A1 | 9/2002 | Katayama | |
| 2003/0107767 A1* | 6/2003 | Ishizaki | 358/1.18 |
| 2003/0112871 A1 | 6/2003 | Demos | |
| 2003/0142199 A1 | 7/2003 | McFarland et al. | |
| 2003/0184826 A1 | 10/2003 | Takemoto et al. | |
| 2003/0189730 A1* | 10/2003 | Enomoto | 358/3.26 |
| 2003/0231862 A1* | 12/2003 | Kawaoka | 386/52 |
| 2004/0005004 A1 | 1/2004 | Demos | |
| 2004/0226467 A1* | 11/2004 | Underwood et al. | 101/484 |
| 2004/0247199 A1 | 12/2004 | Murai et al. | |
| 2005/0002063 A1* | 1/2005 | Hanamoto | 358/1.18 |
| 2005/0033758 A1 | 2/2005 | Baxter | |
| 2005/0097475 A1* | 5/2005 | Makioka et al. | 715/792 |
| 2005/0134939 A1* | 6/2005 | Ikeda et al. | 358/471 |
| 2005/0134946 A1* | 6/2005 | Tsue et al. | 358/537 |
| 2005/0185201 A1 | 8/2005 | Kuwata | |
| 2005/0237588 A1* | 10/2005 | Gohara et al. | 358/538 |
| 2006/0132637 A1* | 6/2006 | Imanura | 348/333.01 |
| 2006/0288304 A1 | 12/2006 | Nomoto et al. | |
| 2007/0003222 A1* | 1/2007 | Shingai | 386/95 |
| 2007/0053668 A1 | 3/2007 | Misawa et al. | |
| 2007/0070408 A1* | 3/2007 | Ono et al. | 358/1.15 |
| 2007/0070442 A1* | 3/2007 | Ohkubo | 358/451 |
| 2007/0073777 A1* | 3/2007 | Werwath et al. | 707/104.1 |
| 2007/0146504 A1* | 6/2007 | Morimoto et al. | 348/231.3 |
| 2007/0174782 A1 | 7/2007 | Russo | |
| 2007/0223049 A1* | 9/2007 | Araya et al. | 358/302 |
| 2007/0258655 A1* | 11/2007 | Motominami | 382/254 |
| 2007/0285573 A1 | 12/2007 | Ichikawa | |
| 2008/0066016 A1 | 3/2008 | Dowdy et al. | |
| 2008/0088706 A1 | 4/2008 | Girgensohn et al. | |
| 2008/0126152 A1* | 5/2008 | Villanueva et al. | 705/7 |
| 2008/0151317 A1 | 6/2008 | Imine | |
| 2008/0174747 A1* | 7/2008 | Fujinawa et al. | 353/122 |
| 2008/0231741 A1* | 9/2008 | McIntyre et al. | 348/333.01 |
| 2009/0009530 A1* | 1/2009 | Araki et al. | 345/619 |
| 2009/0080020 A1* | 3/2009 | Kitagawa | 358/1.15 |
| 2009/0086044 A1* | 4/2009 | Kinemura | 348/220.1 |
| 2009/0116811 A1* | 5/2009 | Kukreja et al. | 386/52 |
| 2009/0316056 A1* | 12/2009 | Rosencwaig et al. | 348/836 |

FOREIGN PATENT DOCUMENTS

| | | | | |
|---|---|---|---|---|
| JP | 2000-98514 | 4/2000 | | |
| JP | 2001-78127 | 3/2001 | | |
| JP | 2001-197445 | 7/2001 | | |
| JP | 2003-299001 | 10/2003 | | |
| JP | 2004-64231 | 2/2004 | | |
| JP | 2004064231 A * | 2/2004 | | H04N 5/91 |
| JP | 2004-282377 A | 10/2004 | | |
| JP | 2005-130254 | 5/2005 | | |
| JP | 2005-160020 A | 6/2005 | | |
| JP | 2006-011754 | 1/2006 | | |
| JP | 2006-513592 A | 4/2006 | | |
| JP | 2007-110224 | 4/2007 | | |
| JP | 2007-221301 | 8/2007 | | |
| JP | 2007-266862 | 10/2007 | | |
| JP | 2008-022482 | 1/2008 | | |
| JP | 2008022482 A * | 1/2008 | | |
| JP | 2008-80522 | 4/2008 | | |
| JP | 2008-271594 A | 11/2008 | | |

OTHER PUBLICATIONS

Japanese Official Action mailed Dec. 7, 2010 in corresponding Japanese Patent Application No. 2008-304804, together with an English language translation.

Japanese Official Action mailed Dec. 7, 2010 in corresponding Japanese Patent Application No. 2008-304804 of related U.S. Appl. No. 12/626,176, together with an English language translation.

Japanese Official Action dated Jul. 27, 2010 with English translation.

Chinese Official Action mailed Aug. 31, 2011 in corresponding Chinese Patent Application No. 200910225847.9 of related U.S. Appl. No. 12/626,184, together with an English language translation.

Japanese Official Action dated Sep. 7, 2010 with English translation.

US Office Action dated Jun. 7, 2013 from related U.S. Appl. No. 12/626,184, filed Nov. 25, 2009.

U.S. Office Action dated Sep. 13, 2012, received in related U.S. Appl. No. 12/626,184.

U.S. Official Action dated Apr. 10, 2013 from related U.S. Appl. No. 12/626,176, filed Nov. 25, 2009.

U.S. Office Action dated Aug. 17, 2012, received in related U.S. Appl. No. 12/626,176.

David Kappos, Subject Matter Eligibility of Computer Readable Media, Feb. 23, 2010, US Patent and Trademark Office, 1351 OG 212.

U.S. Office Action dated Nov. 7, 2012 in related application namely, U.S. Appl. No. 12/817,713.

Japanese Office Action dated May 7, 2013 issued in JP 2009-158008 filed Apr. 22, 2013.

European Official Action dated Mar. 4, 2013 from related European Patent Application 09014747.1.

Japanese Office Action dated Feb. 5, 2013 issued in related Japanese Patent Application 2009-158008.

US Office Action dated Sep. 23, 2013 from related U.S. Appl. No. 12/817,713.

Notice of Allowance dated Sep. 25, 2013 from related U.S. Appl. No. 12/626,176.

US Office Action dated Oct. 30, 2013 from related U.S. Appl. No. 12/626,184.

Notice of Allowance dated Apr. 15, 2014 received in U.S. Appl. No. 12/817,713.

U.S. Office Action dated Mar. 21, 2014 received in U.S. Appl. No. 12/626,184.

Notice of Allowance dated Jul. 16, 2014 received in U.S. Appl. No. 12/626,184.

Tao Mei "Video collage: presenting a video sequence using a single image" The Visual Computer In The Visual Computer, vol. 25, No. 1. (2009), pp. 39-51 published online Aug. 19, 2008.

* cited by examiner

FIG.7A

| FORMAT NAME | ASSIGNED NUMBER |
|---|---|
| AVI FORMAT | 0 |
| MOV FORMAT | 1 |
| MPEG FORMAT | 2 |

FIG.7B

| CODEC NAME | ASSIGNED NUMBER |
|---|---|
| MotionJPEG CODEC | 0 |
| MPEG1 CODEC | 1 |
| DivX CODEC | 2 |

FIG.8

| 71 | 72 | 73 | 74 | 75 |
|---|---|---|---|---|
| 0 | 0 | 0 | 30 | 30 |
| 1 | 0 | 1 | 210 | 30 |
| 2 | 0 | 2 | 390 | 30 |
| 3 | 1 | 0 | 30 | 30 |

~39

PRINTING DEVICE CAPABLE OF DISPLAYING THUMBNAIL IMAGE OF MOTION IMAGE FILE

CROSS REFERENCE TO RELATED APPLICATION

This application claims priority from Japanese Patent Application No. 2008-304805 filed Nov. 28, 2008. The entire content of the priority application is incorporated herein by reference.

TECHNICAL FIELD

The present invention relates to a printing device for printing an image based on data in an image file.

BACKGROUND

A conventional printing device well known in the art reads image files representing photographs or other still images (still image files) from a storage medium, and prints out the still images represented by the image files. Recently, there have also been proposals for printing devices capable of printing out not only still image files, but also image files representing motion images (motion image files).

Since a motion image represented by a motion image file is configured of an enormous number of frame images, making it impractical to print all of the frame images, the printing device prints only specific frame images extracted from the file. The printing device is configured to be able to printing a plurality of frame images extracted from a motion image file in an arrangement on a single page, for example.

The conventional printing device is also configured to display a layout image in which the plurality of frame images extracted from the motion image file is laid out on a single page when a layout mode is selected.

However, the conventional printing device described above displays the layout image representing the motion image file such that all the frame images in the layout image are fitted into a prescribed display region. Therefore, the smaller the display region becomes, the smaller each frame image will be in accordance with the size of the display region. Hence, there arises a difficulty that a user cannot visually confirm each frame image in detail before printing.

SUMMARY

In view of the foregoing, it is an object of the present invention to provide a printing device that enables a user to more efficiently confirm a print image of an image file when selecting the image file.

In order to attain the above and other objects, there is provided a printing device including: an inputting unit that is configured to be capable of inputting an image file representing a motion image; a generating unit that is configured to be capable of extracting a plurality of frame images from the image file and generating a first output image in which the plurality of extracted frame images are laid out on a single page; a displaying unit that is configured to be capable of displaying a plurality of first frame display images that correspond to the plurality of frame images and a first display image corresponding to the first output image, the first display image having a first display size and having a plurality of second frame display images laid out therein in an order the same as the order in which the frame images are laid out in the first output image, the plurality of second frame display images corresponding to the plurality of frame images, each second frame display image having a second frame display size that is smaller than the first display size, each first frame display image having a first frame display size that is greater than the second frame display size; and a printing unit that is configured to be capable of printing the first output image.

According to another aspect of the present invention, there is provided a storage medium storing a program executable on a printing device. The program is provided with a set of program instructions including: inputting one image file representing a motion image; extracting a plurality of frame images from the one image file and generating a first output image in which the plurality of extracted frame images are laid out on a single page; displaying a plurality of first frame display images that correspond to the plurality of frame images and a first display image corresponding to the first output image, the first display image having a first display size and having a plurality of second frame display images laid out therein in an order the same as the order in which the frame images are laid out in the first output image, the plurality of second frame display images corresponding to the plurality of frame images, each second frame display image having a second frame display size that is smaller than the first display size, each first frame display image having a first frame display size that is greater than the second frame display size; and printing the first output image.

According to still another aspect of the present invention, there is provided a storage medium storing a program executable on a computer. The program is provided with a set of program instructions including: inputting one image file representing a motion image; extracting a plurality of frame images from the one image file and generating a first output image in which the plurality of extracted frame images are laid out on a single page; displaying a plurality of first frame display images that correspond to the plurality of frame images and a first display image corresponding to the first output image, the first display image having a first display size and having a plurality of second frame display images laid out therein in an order the same as the order in which the frame images are laid out in the first output image, the plurality of second frame display images corresponding to the plurality of frame images, each second frame display image having a second frame display size that is smaller than the first display size, each first frame display image having a first frame display size that is greater than the second frame display size; and controlling a printing device to print the first output image.

BRIEF DESCRIPTION OF THE DRAWINGS

In the drawings:

FIG. 7A is an explanatory view showing types of file format of motion image files and corresponding numbers associated therewith;

FIG. 7B is an explanatory view showing types of codec of motion image files and corresponding numbers associated therewith;

FIG. 8 is a view conceptually illustrating an LCD position data storage area of the RAM;

DETAILED DESCRIPTION

Figure 1:
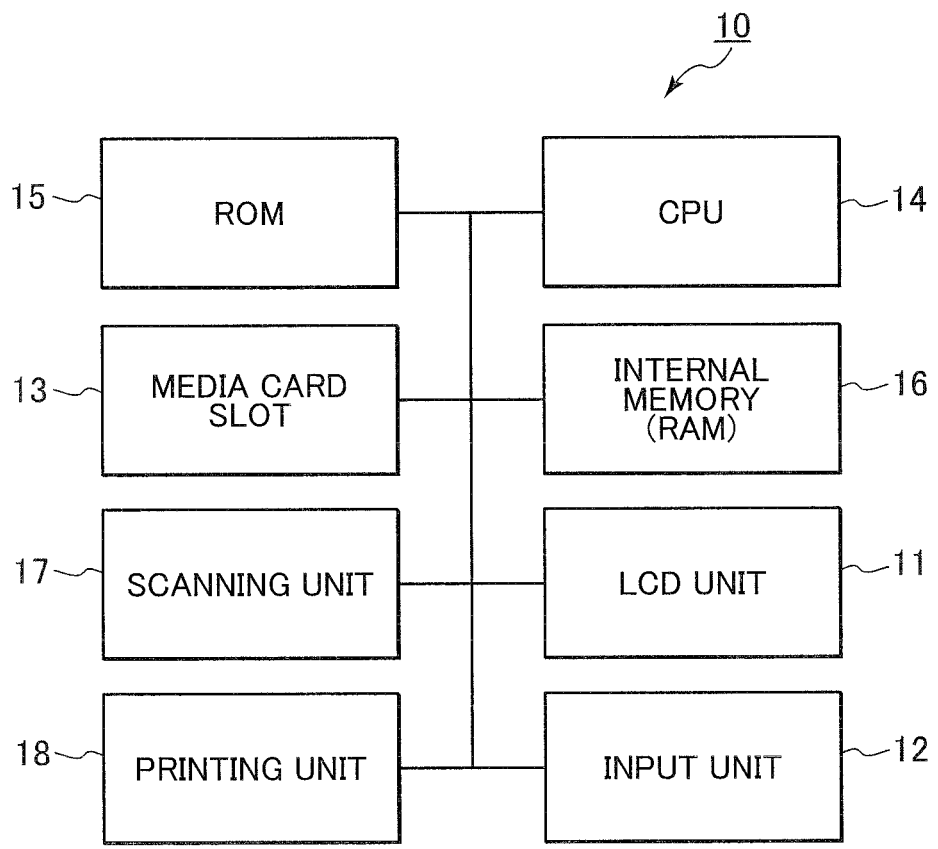
FIG. 1 is a block diagram illustrating an electrical configuration of a multifunctional peripheral according to an embodiment of the present invention, the multifunction peripheral including a CPU, an internal memory (RAM) and an LCD unit.

First, a general configuration of a multifunctional peripheral 10 (hereinafter to be referred to as the "MFP 10") according to an embodiment of the present invention will be described with reference to FIG. 1.

The MFP 10 is provided with various functions, including a printer function, a scanner function, and a color copier function. As shown in FIG. 1, the MFP 10 is provided with a CPU 14, a ROM 15, an internal memory (RAM) 16, an LCD unit 11, an input unit 12, a media card slot 13, a scanning unit 17 and a printing unit 18 that are interconnected with each other by signal lines.

The CPU 14 performs all computations for the MFP 10. The ROM 15 has prestored programs that the CPU 14 executes in order to implement processes described later. The RAM 16 temporarily stores results of computations performed by the CPU 14, inputted data, and the like.

The LCD unit 11 displays images on a compact color liquid crystal display including images of character strings for messages.

The input unit 12 has various operating keys that the user can press, and inputs data based on the pressed keys. More specifically, the input unit 12 includes an Up key, a Down key, a Left key, and a Right key for moving a cursor up, down, left, and right; and an OK key for accepting a selection. The LCD unit 11 and the input unit 12 serve as a user interface of the MFP 10.

The scanning unit 17 scans an image of a document placed on a platen and generates image data representing the scanned image. The printing unit 18 prints image data specified in a print command.

The media card slot 13 receives a media card inserted thereinto, such as an SD card and a CompactFlash card (portable, non-volatile storage media). The MFP 10 also has a direct print function for directly reading image files from a media card inserted in the media card slot 13 and printing images represented by the image files.

The image files discussed herein include both still image files representing still images, and motion image files representing motion images and configured of a plurality of frame images. When the image file to be printed is a motion image file, the MFP 10 extracts a prescribed number (nine in the present embodiment) of frame images from the plurality of frame images constituting the motion image represented by the motion image file, and prints an image (an output image) having the extracted frame images laid out on a single page (See FIG. 14A). When the image file to be printed is a still image file, the MFP 10 prints, as an output image, the still image represented by the still image file on a single page (See FIG. 14B).

Figure 2:
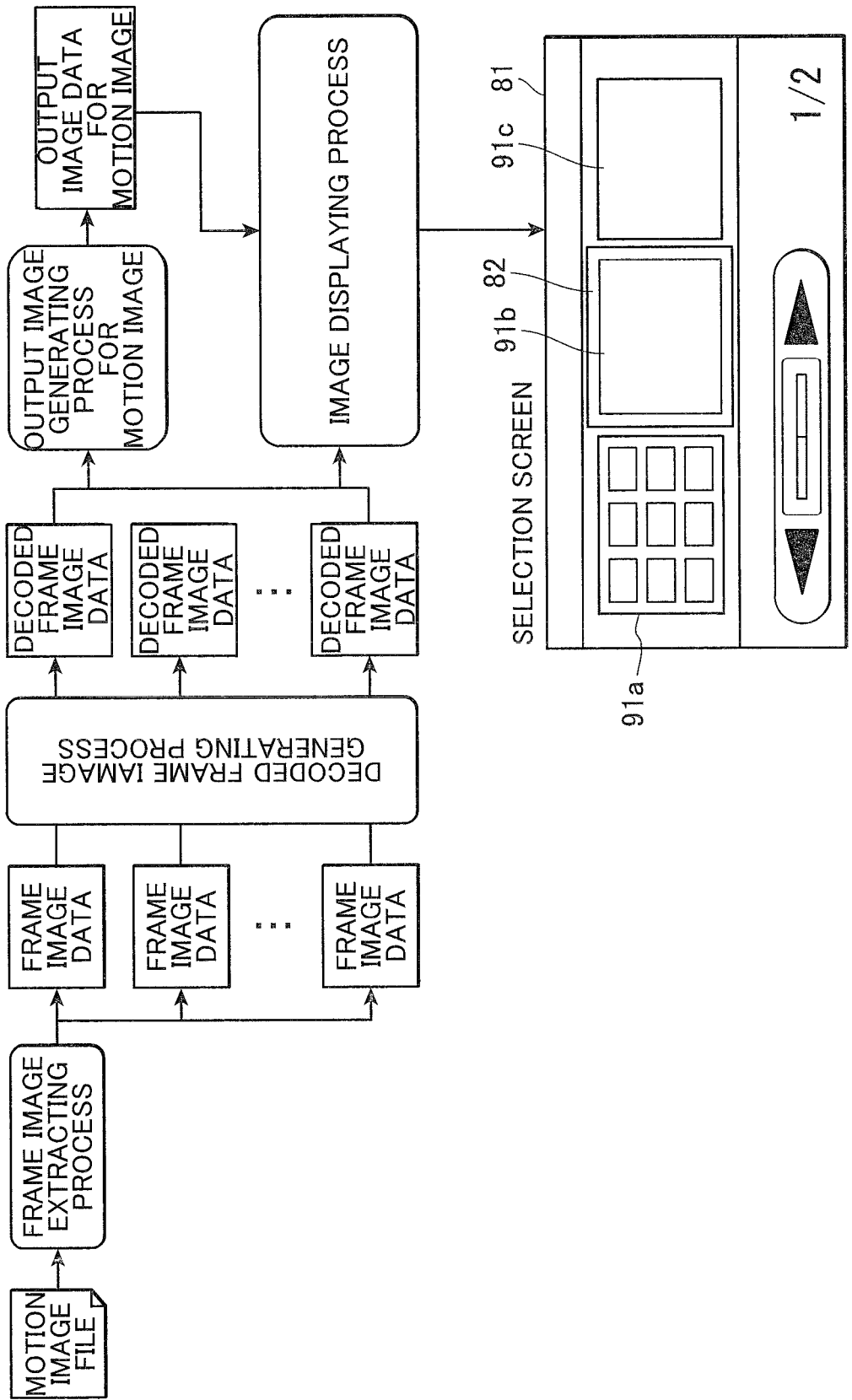
FIG. 2 is an overview illustrating a series of processes the multifunctional peripheral performs.

The MFP 10 also displays a selection screen 81 such as that shown in FIG. 2 on the LCD unit 11, enabling the user to select an image file to be printed from among the plurality of image files stored on the media card and prints images represented by the selected image files. More specifically, the MFP 10 displays output images for all of the image files that are candidates for printing in the selection screen 81 as thumbnail images, from which thumbnail images the user can tell what the output images will look like when the image files are actually printed (hereinafter referred to as the "print images"). The thumbnail images representing still image files and motion image files are the same size.

Figure 3:
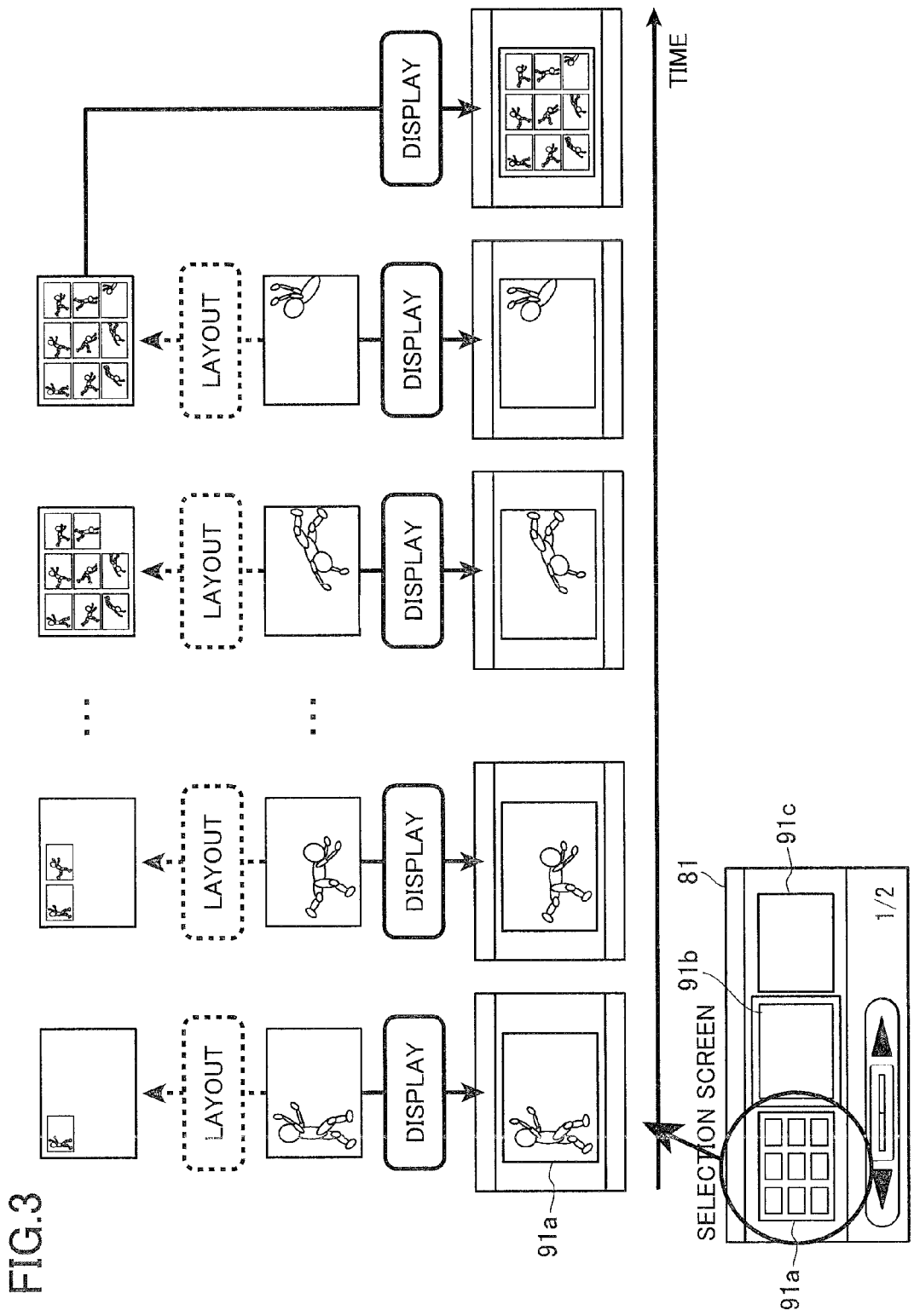
FIG. 3 is a view illustrating how a motion image file is displayed in a selection screen.

In particular, for each motion image file, the MFP 10 displays, before displaying a thumbnail image of an output image (an image in which nine frame images are laid out on a single page), thumbnail images of the nine frame images which will be sequentially laid out in the output image, as shown in FIG. 3. More specifically, the MFP 10 displays, at predetermined time intervals, thumbnail images of the nine frame images, whose size is the same as that of the thumbnail image of the output image, at a display position at which the thumbnail image of the output image is supposed to be displayed in the selection screen 81. In other words, after nine frame images, each of which has been enlarged or reduced into a predetermined size, are displayed sequentially, the output image, in which the nine frame images are arranged on a single page, is displayed after being reduced or enlarged to the predetermined size.

Next, an overview of a series of processes that enables the MFP 10 to realize such display of a motion image file described above will be described with reference to FIG. 2.

The MFP 10 performs a frame image extracting process in which nine sets of frame image data (in a compressed format) are extracted from a motion image file to be printed, and a decoded frame image generating process in which decoded frame image data is generated. The decoded frame image data is the frame image data on which an expansion (decoding) process has been performed. Therefore, the decoded data is in a format in which pixel calculations are possible.

The frame image extracting process and the decoded frame image generating process are executed for each frame image data. In other words, these processes are repeated a predetermined number of times, depending on how many frame images are extracted from each motion image file (i.e., for nine times in the present embodiment). Therefore, the nine sets of decoded frame image data are generated sequentially, not at one time. The MFP 10 then arranges the generated decoded frame image data sequentially into corresponding storage regions in a single page, thereby generating output image data representing a print image of the motion image file (an output image generating process for motion image).

Concurrently with executing the output image generating process for the motion image, each time one decoded frame image data is generated, the MFP 10 performs an image displaying process in which a thumbnail image of the generated decoded frame image data (i.e., a thumbnail image of a frame image) is displayed at a designated display position in the selection screen 81 (See FIG. 2). With this process, even though output image data has not yet been generated, the frame images are displayed as thumbnail images sequentially in their order of generation.

When the decoded frame image data for the nine frame images are all generated and the output image data in which these nine decoded frame image data are arranged on a single page is subsequently generated, the MFP 10 displays a thumbnail image of the output image data (a thumbnail image of the print image) in the selection screen 81 for selection. The thumbnail image of the output image data is displayed in the selection screen 81 at the position the same as the position where the thumbnail images of the decoded frame image data were displayed.

With all the processes described above, thumbnail images of nine frame images are first sequentially displayed, and a thumbnail image of the output image is then displayed in the selection screen 81.

Next, storage areas of the RAM 16 will be described with reference to FIGS. 4 through 11.

Figure 4:
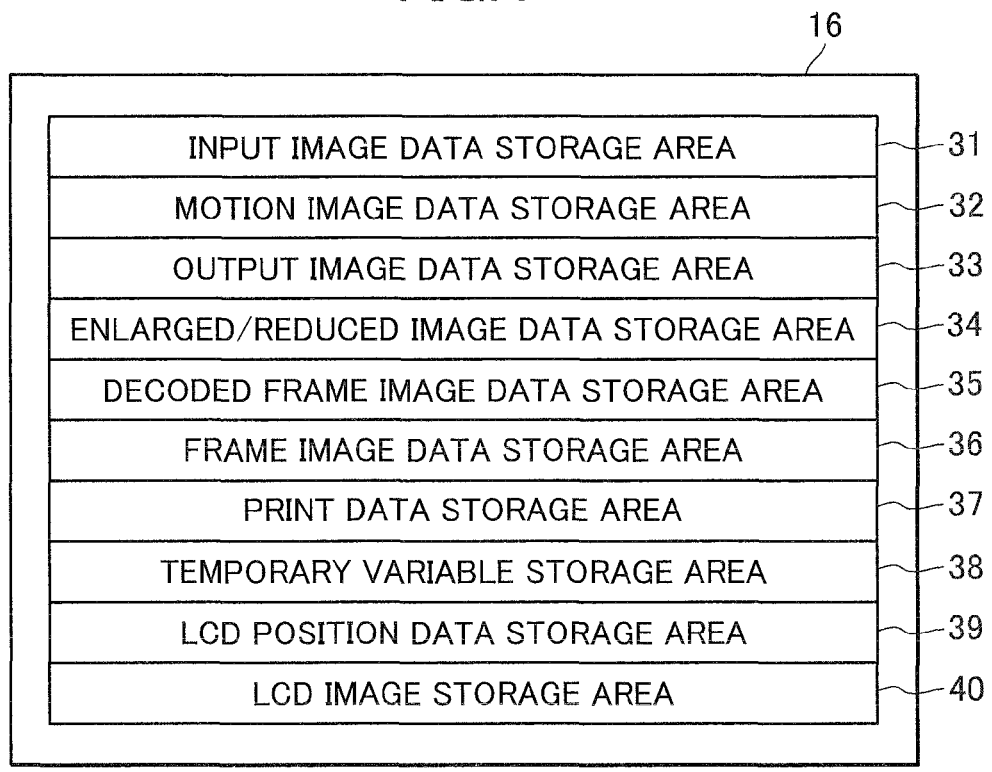
FIG. 4 is a conceptual diagram explaining storage areas of the RAM in the multifunctional peripheral.

As shown in FIG. 4, the RAM 16 is configured with various storage areas for storing different types of data. The storage areas include an input image data storage area 31, a motion image data storage area 32, an output image data storage area 33, an enlarged/reduced image data storage area 34, a decoded frame image data storage area 35, a frame image data storage area 36, a print data storage area 37, a temporary variable storage area 38, an LCD position data storage area 39, and an LCD image storage area 40.

Figure 5:
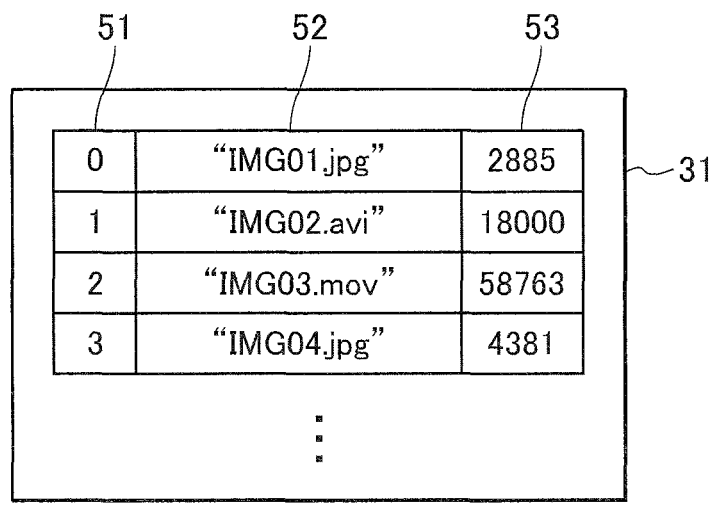
FIG. 5 is a view conceptually illustrating an input image data storage area of the RAM.

The input image data storage area 31 serves to store data on image files stored on a media card inserted in the media cart slot 13. As shown in FIG. 5, the input image data storage area 31 is divided into an input image ID storage area 51, an input image filename storage area 52, and an input image file size storage area 53.

The input image ID storage area 51 serves to store IDs for image files stored on the media card. The IDs are assigned sequentially beginning from 0 based on the number of image files (hereinafter referred to as "input image IDs"). The input image IDs are assigned to the image files in the order that the files are read from the media card.

The input image filename storage area 52 serves to store filenames of the image files. The input image filename storage area 52 is a 256-byte region, with each byte capable of storing data for one character.

The input image file size storage area 53 serves to store numerical values (values in units of kilobytes in this example) indicating the file sizes of the image files.

Figure 6:
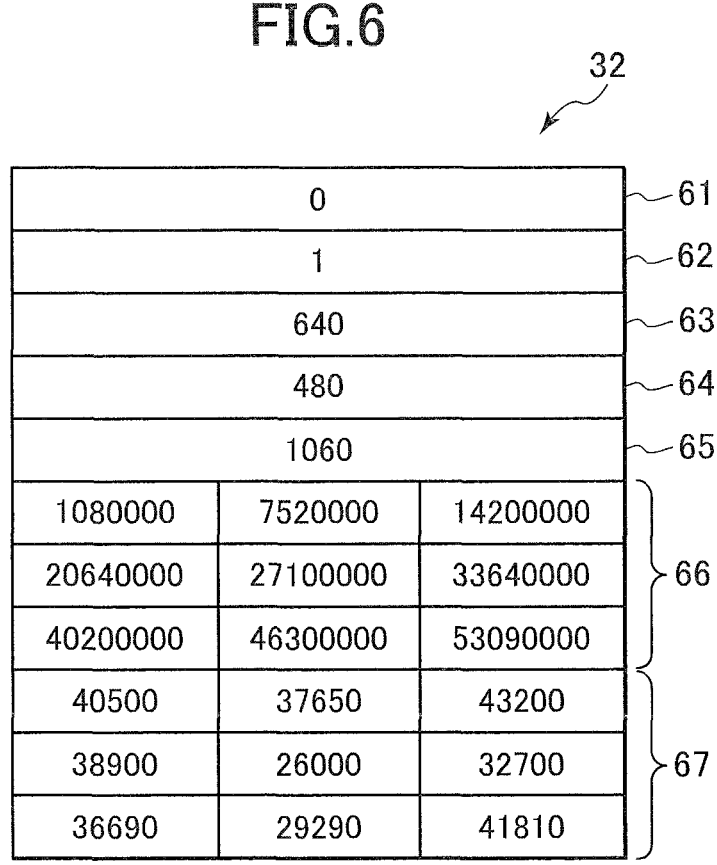
FIG. 6 is a view conceptually illustrating a motion image data storage area of the RAM.

The motion image data storage area 32 serves to temporarily store data read from the media card for a motion image file being processed. As shown in FIG. 6, the motion image data storage area 32 is provided with a format type storage area 61, a codec type storage area 62, a horizontal size storage area 63, a vertical size storage area 64, a total frame number storage area 65, an extraction position data storage area 66 and an extraction size data storage area 67.

The format type storage area 61 stores data of a type of file format for the motion image file being processed. In the present embodiment, the format type storage area 61 may store one of the values 0, 1, or 2 that have been preassigned to one of three file formats, as shown in FIG. 7A.

The codec type storage area 62 stores data of a type of codec for the motion image file being processed. In the present embodiment, the codec type storage area 62 may store one of the values 0, 1, or 2 that have been preassigned to one of three types of codecs, as shown in FIG. 7B.

The horizontal size storage area 63 stores numerical data indicating the number of pixels in the horizontal direction of the motion image file (frame image) being processed.

The vertical size storage area 64 stores numerical data indicating the number of pixels in the vertical direction for the motion image file (frame image) being processed.

The total frame number storage area 65 stores numerical data indicating a total number of frame images (number of frames) constituting the motion image file being processed.

The extraction position data storage area 66 stores data identifying where each of nine frame images extracted from the motion image file being processed is positioned within the motion image file. More specifically, the extraction position data storage area 66 stores numerical values (values in units of bytes in this example) indicating an amount of offset from the beginning of the motion image file to the start of data for each frame image. A motion image file is configured of data for frame images arranged sequentially between header data at the beginning of the file and index data at the end of the file. Thus, the amount of offset is a value indicating the size of data from the start of the motion image file (the start of the header data in this case) to the start of frame image data targeted for extraction. The amount of offset is stored in units of bytes rather than kilobytes in order to accurately identify the position from which the frame image data begins.

Figure 14A:
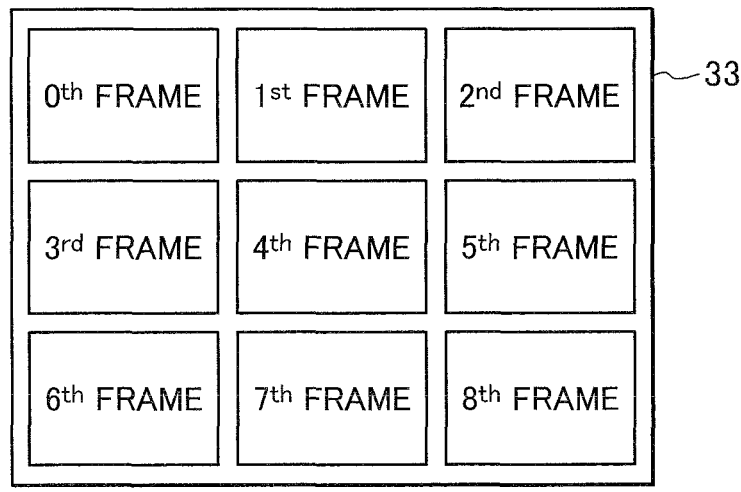
FIG. 14A is an explanatory view of an output image data storage area in which frame images extracted from a motion image file are laid out.

In the present embodiment, the MFP 10 automatically identifies nine frame images, including the first image (the first frame), the last image (the last frame), and seven images (seven frames) distributed equally therebetween, by dividing the total number of frames in the motion image file in eight equal intervals. Specifically, the MFP 10 extracts the nine frame images from the motion image file in chronological order and lays out and prints these frame images in the same order. FIG. 14A illustrates the layout of nine frame images denoted as $0^{th}$ through $8^{th}$ frames. Further, rather than referencing the total number of frames, the motion image file may be divided into eight equal time intervals by referencing the playback time of the motion image, for example.

The extraction size data storage area 67 stores data sizes of the frame image data (in a compressed format) for the extracted nine frame images and also has nine storage areas like the extraction position data storage area 66. Each of these storage areas serves to store a numerical value (a value in units of bytes, for example) indicating the data size of the corresponding frame image.

The nine areas of the extraction position data storage area 66 are correlated with the nine areas of the extraction size data storage area 67. Thus storage areas with the same layout position hold data related to the same frame image.

Figure 14B:
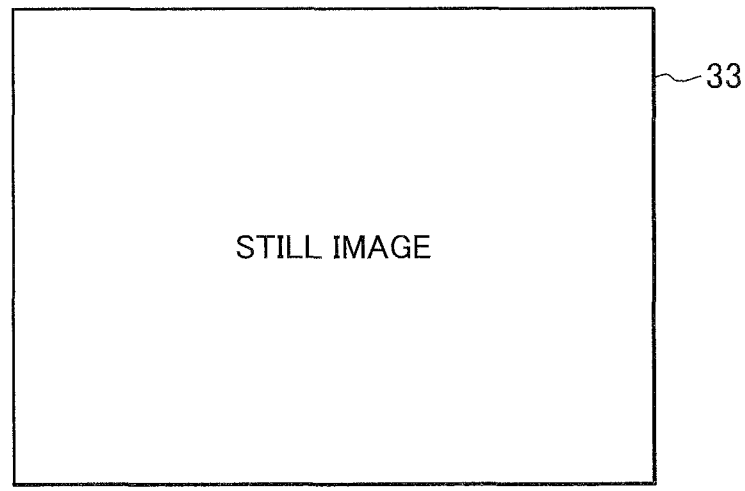
FIG. 14B is an explanatory view of the output image data storage area in which a still image is laid out.

The output image data storage area 33 serves to temporarily store output image data for a motion image file by sequentially laying out nine frame images extracted from the motion image file as shown in FIG. 14A, and to temporarily store output image data for a still image file by laying out one still image represented by the still image file as shown in FIG. 14B.

The enlarged/reduced image data storage area 34 serves to store enlarged/reduced image data generated by converting (expanding or reducing) the output image data to a predetermined thumbnail image size.

The decoded frame image data storage area 35 serves to store image data (decoded frame image data) on which an expansion (decoding) process has been performed.

The frame image data storage area 36 serves to store frame image data extracted from a motion image file. The frame image data stored in this region is in a compressed state (the JPEG format, for example) and has not yet been expanded (decoded).

The print data storage area 37 serves to temporarily store print data for actual printing that has been produced by converting the output image data.

The temporary variable storage area 38 serves to temporarily store variables and counters, such as a page no. counter, cursor position counter, processing page no. variable, generated image counter, process frame image counter, pixel counter and line counter. These variables and counters are used during various processes executed by the CPU 14, as will be described later.

The LCD position data storage area 39 serves to store data indicating a display page (described later) of the selection screen 81, and a display position at which each thumbnail image is to be positioned. As shown in FIG. 8, the LCD position data storage area 39 is provided with an input image ID storage area 71, a display page no. storage area 72, a display image position number storage area 73, a horizontal display coordinate storage area 74 and a vertical display coordinate storage area 75.

The input image ID storage area 71 stores input image IDs for the image files, which correspond to the input image IDs stored in the input image ID storage area 51 of the input image data storage area 31.

The display page no. storage area 72 stores, for each input image ID, a page number of the selection screen 81 on which the thumbnail image for the corresponding image file should be displayed. Since there is a limit to the number of thumbnail images that can be displayed simultaneously on the LCD unit 11 (three in the present embodiment), the user must switch among a plurality of pages of the selection screen 81 when the number of selectable image files exceeds this limit.

Figure 9A:
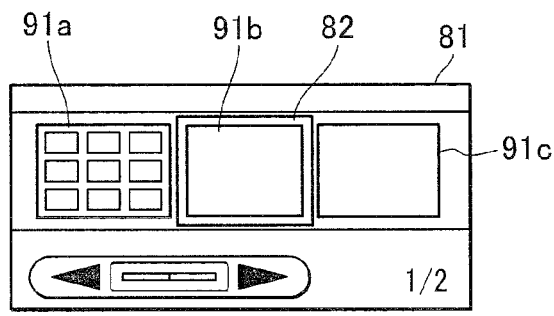
FIG. 9A is a view showing an example of a first page of a selection screen shown on the LCD unit of the multifunctional peripheral.
Figure 9B:
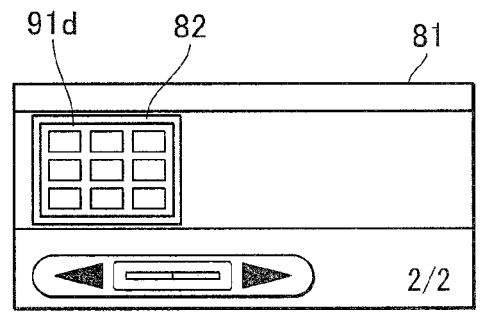
FIG. 9B is a view showing an example of a second page of the selection screen shown in the LCD unit of the multifunctional peripheral.

The display image, position number storage area 73 stores one of the numbers 0, 1, and 2 to indicate the position at which each thumbnail image should be displayed on the selection screen 81 ($0^{th}$, $1^{st}$, or $2^{nd}$ position from the left). Now assume that four image files are stored on the media card and are assigned input image IDs of 0, 1, 2 and 3. In this case, thumbnail images 91a, 91b and 91c for the image files having IDs of 0-2 are displayed on a first page of the selection screen 81 respectively at left, center and right positions, as shown in FIG. 9A, and the remaining thumbnail image 91d for the image file having ID of 3 is displayed at the left position on a second page, as shown in FIG. 9B.

The horizontal display coordinate storage area 74 stores data for a horizontal image layout starting point indicating a horizontal starting point at which each thumbnail image is to be displayed on the LCD unit 11.

Figure 10:
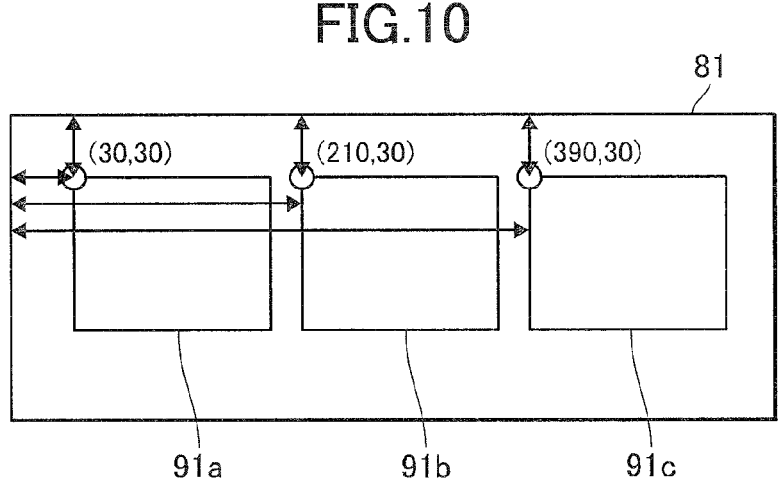
FIG. 10 is a view indicating vertical and horizontal layout starting positions at which each thumbnail image is arranged to be displayed on the selection screen.

The vertical display coordinate storage area 75 stores data for a vertical image layout starting point indicating a vertical starting point at which each thumbnail image is to be displayed on the LCD unit 11. Each circle in FIG. 10 shows positions corresponding to each combination of coordinates stored in the horizontal display coordinate storage area 74 and the vertical display coordinate storage area 75.

Figure 11:
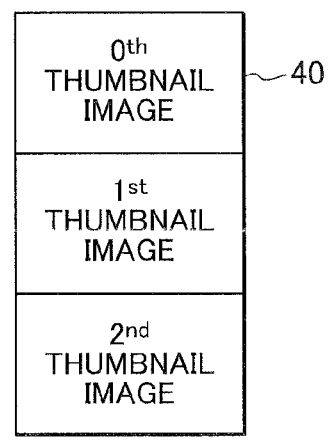
FIG. 11 is a view conceptually showing an LCD image storage area of the RAM.

The LCD image storage area 40 serves to store thumbnail images to be displayed simultaneously on the LCD unit 11. Specifically, as shown in FIG. 11, the LCD image storage area 40 has a plurality of sub-regions for storing thumbnail images, each sub-region being assigned one of the position numbers $0^{th}$, $1^{st}$, and $2^{nd}$ that correspond to the numbers (0, 1 and 2) stored in the display image position number storage area 73. The thumbnail images 91a, 91b, 91c are respectively stored in the sub-regions of the position numbers $0^{th}$, $1^{st}$, and $2^{nd}$, to display the first page of the selection screen 81. The thumbnail image 91d is stored in the sub-region of the position number $0^{th}$ to display the second page of the selection screen 81.

Next, processes executed by the CPU 14 will be described in detail with reference to FIGS. 12 through 16.

The CPU 14 of the MFP 10 performs the following processes (1)-(4):

(1) a media image printing process;
(2) an output image generating process;
(3) an image displaying process; and
(4) a printing process.

The CPU 14 executes the media image printing process (process (1) described above) when the user performs an operation on the input unit 12 to select a 'media image printing mode' while a media card storing image files is inserted in the media card slot 13. The other processes (2)-(4) are executed as subroutines called during the media image printing process.

Figure 12:
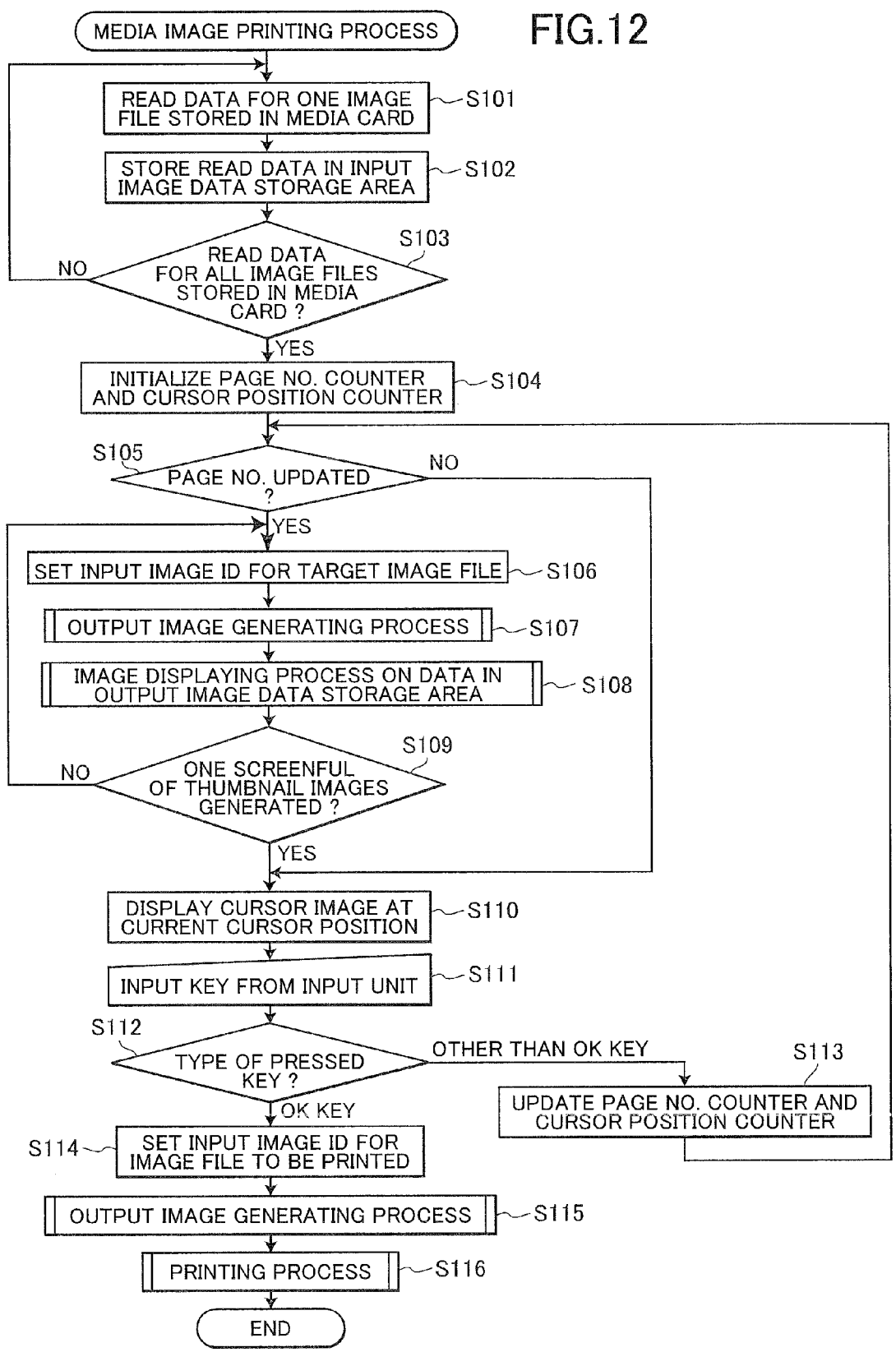
FIG. 12 is a flowchart of a media image printing process executed by the CPU of the multifunctional peripheral.

First, the media image printing process executed by the CPU 14 of the MFP 10 will be described while referring to a flowchart in FIG. 12.

In S101 at the beginning of this media image printing process, the CPU 14 reads data (a filename and file size) for one image file stored in the media card.

In S102 the CPU 14 stores the data read in S101 in the input image data storage area 31 in association with one input image ID. The CPU 14 further stores the input image ID and display page and position data for the subject image file (data of a display page and position at which a thumbnail image for the subject image file should be displayed) in the input image ID storage area 71, the display page no. storage area 72, the display image position number storage area 73, the horizontal display coordinate storage area 74 and the vertical display coordinate storage area 75 in the LCD position data storage area 39.

In S103 the CPU 14 determines whether data for all image files stored in the media card has been read.

If the CPU 14 determines that data for all image files has not been read (S103: NO), the CPU 14 returns to S101 and reads data for one of the remaining image files.

However, if data has been read for all image files (S103: YES), in S104 the CPU 14 initializes both of the page no. counter and the cursor position counter (prestored in the temporary variable storage area 38) to 0. The page no. counter represents on which page a cursor image 82 (see FIG. 9AB) is currently being located among all the pages available in the selection screen 81. The cursor position counter represents the position at which the cursor image 82 is currently being located among the three thumbnail images simultaneously displayed on one page of the selection screen 81. The page no, counter and the cursor position counter are interlocked with the user's operations of the Up, Down, Left and Right keys in the input unit 12.

In S105 the CPU 14 determines whether the page no. of the selection screen 81 has been updated. Specifically, the processing page no. variable is prestored in the temporary variable storage area 38 for representing a page no. on which an image file currently being processed is located among all the pages available in the selection screen 81. The processing page no. variable is given an initial value of −1. The CPU 14 determines whether the page no. of the selection screen 81 has been updated by the user by comparing the value of the processing page no. variable with the value of the page no. counter, and judges that the page no. has been updated by the user when the two values are different. The processing page no. variable has been set to an initial value of −1 to ensure that the CPU 14 makes a YES determination the first time S105 is performed. After reaching a YES determination in S105, before executing the process of S106, the processing page no. variable is updated to match the value of the page no. counter.

When the CPU 14 determines that the values of the processing page no. variable and the page no. counter are different from each other, i.e., the CPU 14 determines that the page no. was updated by the user (S105: YES), in S106 the CPU 14 sets the input image ID of an image file to be processed (target image file). Here, specifically, the generated image counter has been stored in the temporary variable storage area 38 for counting how many output images have been generated for being displayed on one page of the selection screen 81. The CPU 14 assigns the input image ID for the target image file with an input image ID that is stored in the input image ID storage area 71 in association with a combination of the value in the display page no. storage area 72 that is equal to the current value of the page no. counter and the value in the display image position number storage area 73 that is equal to the current value of the generated image counter. The value stored in the generated image counter is always reset to 0 when the CPU 14 advances from S105 to S106.

In S107 the CPU 14 executes the output image generating process (process (2) described above) on a targeted image file whose input ID has been set in S106. In S107, the CPU 14 generates output image data for the targeted image file (image data representing an image to be printed) in the output image data storage area 33. Details of the output image generating process will be described later with reference to FIG. 13.

In S108 the CPU 14 executes the image displaying process (process (3) described above) on the output image data stored in the output image data storage area 33 (as a result of the output image generating process executed in S107). Through this process, a thumbnail image of the targeted image file represented by the output image data that was stored in the output image data storage area 33 in S107 is displayed on the LCD unit 11. Particularly, if a motion image file is being processed, the thumbnail image of the output image for the motion image file is displayed after thumbnail images of all the frame images extracted from the motion image file are sequentially displayed. Details of the image displaying process will be described later with reference to FIG. 15.

In S109 the CPU 14 determines whether one screenful of thumbnail images has been generated. The CPU 14 increments the generated image counter by 1 in S109 upon determining that one screenful of thumbnail images has not been generated (S109: No) and returns to S106 to generate another thumbnail image.

Specifically, in S109 the CPU 14 determines whether one screenful of thumbnail images has been generated based on whether the value of the generated image counter has reached the maximum number of images that can be displayed in one screen (since three images can be displayed simultaneously in the selection screen 81 in the present embodiment, the maximum image number is set to two because the initial value of the generated image counter is 0).

Further, if there are less than three thumbnail images in the last page to be displayed on the selection screen 81, the CPU 14 determines that one screenful of thumbnail images has been generated by referring to the input image ID in addition to the value of the generated image counter. If the input image ID indicates the target image file is the last file, even though the value of the generated image counter does not reach the maximum number (i.e., the current value of the generated image counter remains either 0 or 1 in this example), the CPU 14 does not endlessly repeat the process S106-S109 but determines that one screenful of thumbnail images has been generated in S109.

When one screenful of thumbnail images is determined to have been generated (S109: YES), in S110 the CPU 14 displays a cursor image 82 in an image display region associated with the cursor position counter. As shown in FIGS. 9A and 9B, the cursor image 82 in the present embodiment is a yellow border surrounding a thumbnail image displayed in the LCD unit 11.

The CPU 14 also jumps to S110 after determining in S105 that the page no. was not updated by the user.

In S111 the CPU 14 receives data inputted from the input unit 12 when the user presses an operating key in the input unit 12.

In S112 the CPU 14 determines based on the data inputted in S111 whether the pressed key was the OK key or another key, such as the Up key, Down key, Left key, or Right key.

If the CPU 14 determines in S112 that the pressed key was a key other than the OK key, in S113 the CPU 14 updates the page no. counter and/or the cursor position counter.

For example, when the pressed key was the Down key or Right key, the CPU 14 increments the cursor position counter by 1 in order to move the position of the cursor image 82 rightward one place. However, if the value of the cursor position counter exceeds the maximum value (2 in the present embodiment since the counter was initially set to 0) as a result of this increment, such as when the Down key or Right key was pressed when the cursor image 82 is in the rightmost position, the CPU 14 resets the cursor position counter to 0 and increments the page no. counter by 1. In this case, if the value of the page no. counter would exceed the maximum value (the page number of the last page −1, since the counter is initially set to 0) as a result of this increment, i.e., when there is no next page, the CPU 14 maintains the page no. counter at the maximum value without incrementing the counter.

On the other hand, if either the Up key or Left key was pressed in S112, the CPU 14 decrements the cursor position counter by 1 in order to move the position of the cursor image 82 leftward one place. In this case, if the value of the cursor position counter would be less than 0 following this decrementing operation, such as when the Up key or Left key was pressed when the cursor image 82 was already in the leftmost position, the CPU 14 resets the cursor position counter to 0 and decrements the page no. counter by 1. In this case, if the value of the page no. counter would be less than 0 as a result of the decrementing operation, i.e., when no previous page exists, the CPU 14 maintains the value of the page no. counter at 0 without decrementing the counter.

The CPU 14 returns to S105 after finishing S113.

However, if the CPU 14 determines in S112 that the pressed key was the OK key, in S114 the CPU 14 assigns the input image ID for an image file to be printed with an input image ID that is stored in the input image ID storage area 71 in association with a combination of the value of the display page no. storage area 72 that is equal to the current value of the page no. counter and the value of the display image position number storage area 73 that is equal to the current value of the cursor position counter.

In S115 the CPU 14 executes the output image generating process on the image file having the input image ID set as the printing target in S114. As a result of this process, output image data for the targeted image file (image data representing the print image) is generated in the output image data storage area 33.

In S116 the CPU 14 executes the printing process (process (4) described above) on the output image data stored in the output image data storage area 33 as a result of the output image generating process executed in S115 and subsequently ends the current media image printing process. Details of the printing process will also be described later.

Figure 13:
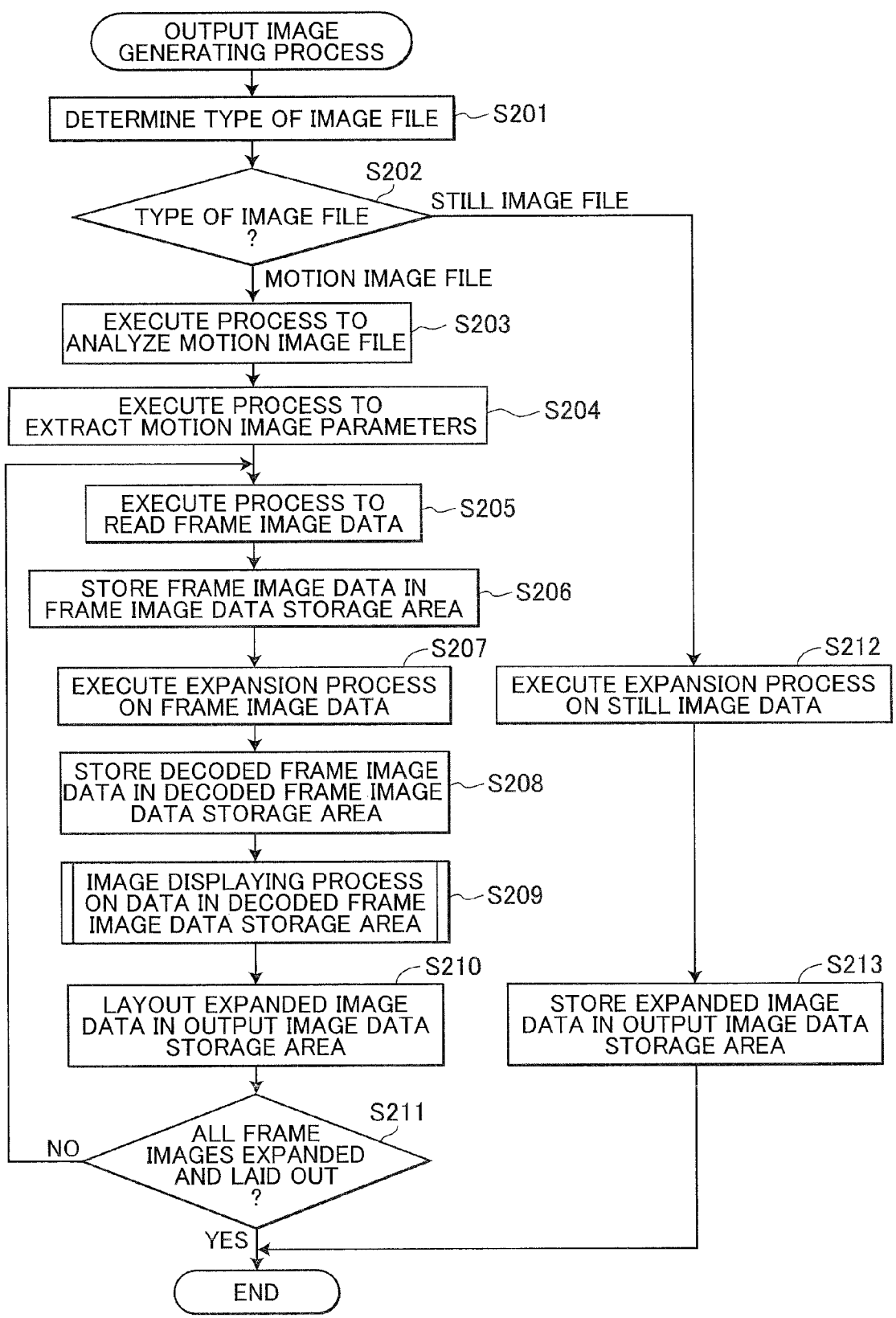
FIG. 13 is a flowchart of an output image generation process in the media image printing process.

Next, the output image generating process (process (2) described above) executed in S107 and S115 of the media image printing process will be described with reference to a flowchart in FIG. 13. The output image generating process is configured to be executed in S107 on the image file whose ID has been set in S106 to be displayed on the selection screen 81, while to be performed in S115 on the image file whose ID has been set in S114 as a target to be printed.

In S201 at the beginning of the output image generating process, the CPU 14 determines the type of the targeted image file by referencing the header data therein. Specifically, the CPU 14 refers to the filename stored in the input image filename storage area 52 in association with the ID of the targeted image file in the input image data storage area 31. By using the filename, the CPU 14 directly accesses the target image file stored on the media card and refers to the header data therein.

In S202 the CPU 14 determines whether the type of image file determined in S201 is classified as a still image file or a motion image file.

If the CPU 14 determines in S202 that the image file is a motion image file, then in S203 the CPU 14 executes a process to analyze the motion image file. Through this analytical process, the CPU 14 acquires format type data and codec type data for the motion image file. The CPU 14 stores these data respectively in the format type storage area 61 and codec type storage area 62 of the motion image data storage area 32 (See FIG. 5).

In S204 the CPU 14 executes a process to extract motion image parameters from the motion image file. Through this extraction process, the CPU 14 acquires horizontal size data, vertical size data, and total frame number data for the motion image file; and the extraction position data and extraction size data for each of the nine frames to be extracted. The CPU 14 stores these data respectively in the horizontal size storage area 63, vertical size storage area 64, total frame number storage area 65, extraction position data storage area 66, and extraction size data storage area 67 of the motion image data storage area 32, as shown in FIG. 6. If data for a different motion image file has already been stored in the motion image data storage area 32 at this time, the CPU 14 first deletes the existing data before storing the data for the motion image file currently being processed (overwrites the existing data).

In S205 the CPU 14 performs a process to read, from the motion image file, data of a frame image to be processed from among the nine frame images ($0^{th}$ through $8^{th}$ frames) based on the extraction position data and extraction size data stored in the extraction position data storage area 66 and extraction size data storage area 67, respectively. Here, the process frame image counter prestored in the temporary variable storage area 38 is given an initial value of 0, and the CPU 14 targets data for the frame image corresponding to the value of the process frame image counter. As will be described later, the value of the process frame image counter is incremented after processing data for each frame image.

In S206 the CPU 14 stores the frame image data read in S205 in the frame image data storage area 36.

In S207 the CPU 14 performs an expansion (decoding) process on the frame image data stored in the frame image data storage area 36 and converts this data to a format in which pixel calculations are possible (such as image data expressing RGB values for each pixel as numerical values from 0 to 255).

In S208 the CPU 14 sequentially stores the pixel data expanded in S207 (decoded frame image data) in the decoded frame image data storage area 35.

In S209 the CPU 14 performs an image displaying process on the decoded frame image data stored in the decoded frame image data storage area 35, by which process a thumbnail image of the frame image represented by the decoded frame image data stored in the decoded frame image data storage area 35 is displayed on the LCD unit 11. Details of the image displaying process will be described later with reference to FIG. 15.

In S210 the CPU 14 sequentially stores the pixel data expanded in S207 in the output image data storage area 33 at a position corresponding to the frame image being processed. When executing S210, if output image data for a separate image file is already stored in the output image data storage area 33, the CPU 14 first deletes the existing output image data before storing the new output image data for the currently targeted image file (i.e., overwrites the existing data).

In S211 the CPU 14 determines whether the expansion process and layout process have been performed for all frame images. Specifically, the CPU 14 increments the process frame image counter by 1 each time processing of S207-S210 for one frame image is completed. The CPU 14 determines that the expansion process and layout process have been performed on all frame images when the value of the process frame image counter reaches the value (the number of frame images to be laid out −1), i.e., eight in the present embodiment.

If the CPU 14 determines that the expansion process and layout process have not been completed for all frame images (S211: NO), the CPU 14 returns to S205 and repeats the above process on data for an unprocessed frame image. By repeatedly executing the processes of S205-S211, the CPU 14 lays out the nine frame images in their order of extraction (i.e., based on their positional order in the motion image), as illustrated in FIG. 14A. In the present embodiment, a margin is provided around each frame image when the frame images are laid out, but this margin is not necessarily required.

However, if the CPU 14 determines that the expansion process and layout process have been completed for all frame images (S211: YES), the CPU 14 ends the current output image generating process. At this time, the image data stored in the output image data storage area 33 (pixel data representing an image in which nine frame images are laid out) is the output image data for the motion image file.

On the other hand, if the CPU 14 determines in S202 described above that the image file is a still image file, then in S212 the CPU 14 performs an expansion process on the still image file to convert the image data in the still image file to a format in which pixel calculations are possible.

In S213 the CPU 14 stores the image data expanded, in S212 in the output image data storage area 33, and subsequently ends the current output image generating process. In other words, for still image files, unlike motion image files, a single still image is laid out in the output image data storage area 33, as illustrated in FIG. 14B. At this time, the image data stored in the output image data storage area 33 (pixel data representing a still image) is the output image data for the still image file.

Figure 15:
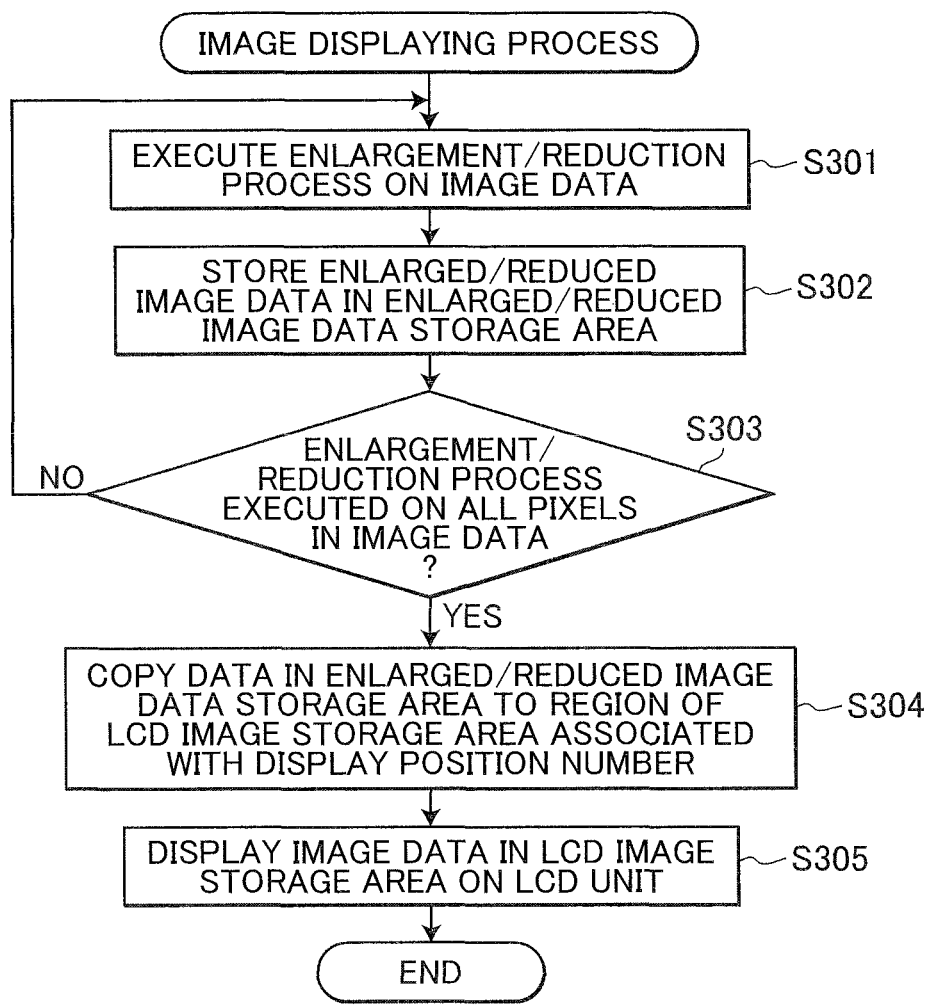
FIG. 15 is a flowchart of an image displaying process in the media image printing process.

Next, the image displaying process (process (3) described above) will be described with reference to a flowchart in FIG. 15. The image displaying process is executed in S108 of the media image printing process, in S209 of the output image generating process which is executed in S107, and in S209 of the output image generating process which is executed in S115. In S108, the image displaying process is executed on the output image data that has been generated in S107 for the targeted image file whose ID has been set in S106 of the media image printing process. In S209 of S107, the image displaying process is executed on the decoded frame image data that has been stored in the decoded frame image data storage area 35 in S208 for the targeted image file whose ID has been set in S107. In S209 of S115, the image displaying process is executed on the decoded frame image data that has been stored in the decoded frame image data storage area 35 in S208 for the targeted image file whose ID has been set in S114.

In S301 at the beginning of the image displaying process, the CPU 14 executes a process to enlarge or reduce the targeted image data (i.e., the output image data stored in the output image data storage area 33 when this image displaying process is executed in S108 of the media image printing process; or the decoded frame image data stored in the decoded frame image data storage area 35 when this process is executed in S209 during the output image generating process) Here, through this enlargement/reduction process, the CPU 14 generates an enlarged/reduced image (thumbnail image) by converting (enlarging or reducing) the targeted image data to a predetermined size for thumbnail images. The CPU 14 determines whether to execute an enlargement process or a reduction process by comparing the pixel size of the targeted image data with the pixel size of thumbnail images to be displayed on the LCD unit 11.

Usually the reduction process is performed on the targeted image data since the pixel size of the targeted image data is normally greater than that of the thumbnail images. However, conceivably, the pixel size of the targeted image data could be smaller than that of the thumbnail images, in which case the enlargement process would be executed on the targeted image data. It is also conceivable that the pixel size of the targeted image data could be the same as that of the thumbnail images, in which case it is not necessary to perform an enlargement or reduction process on the image data. The enlargement and reduction processes are performed using well known algorithms, such as the nearest neighbor algorithm, bilinear algorithm, or bicubic algorithm, to generate an enlarged/reduced image one pixel at a time.

In S302 the CPU 14 stores the image data resulting from the enlargement/reduction process of S301 in the enlarged/reduced image data storage area 34.

In S303 the CPU 14 determines whether the enlargement/reduction process has been executed on all pixels in the targeted image data. In the present embodiment, the pixel counter has been prestored in the temporary variable storage area 38 for counting the number of pixels on which the enlargement/reduction process has already been completed. The pixel counter is given an initial value of 0. The CPU 14 increments this pixel counter by one each time the process in S301 is performed. The CPU 14 determines that the enlargement/reduction process has been executed for all pixels in the targeted image when the value of the pixel counter reaches the number of pixels in the targeted image data.

The CPU 14 returns to S301 upon determining in S303 that the enlargement/reduction process has not been executed for all pixels in the targeted image (S303: No).

However, if the CPU 14 determines that the enlargement/reduction process has been completed for all pixels (S303: YES), in S304 the CPU 14 copies the data stored in the enlarged/reduced image data storage area 34 to a region of the LCD image storage area 40 that is associated with a display position number for the targeted image file (see FIG. 11) which is indicated by the current value of the generated image counter.

In S305 the CPU 14 displays the data stored in the region of the LCD image storage area 40 corresponding to the display position number on the display unit 11 at a display position in association with the coordinates stored in the horizontal display coordinate storage area 74 and the vertical display coordinate storage area 75 of the LCD position data storage area 39 for the image ID of the targeted image file. Subsequently, the CPU 14 ends the image displaying process.

Figure 16:
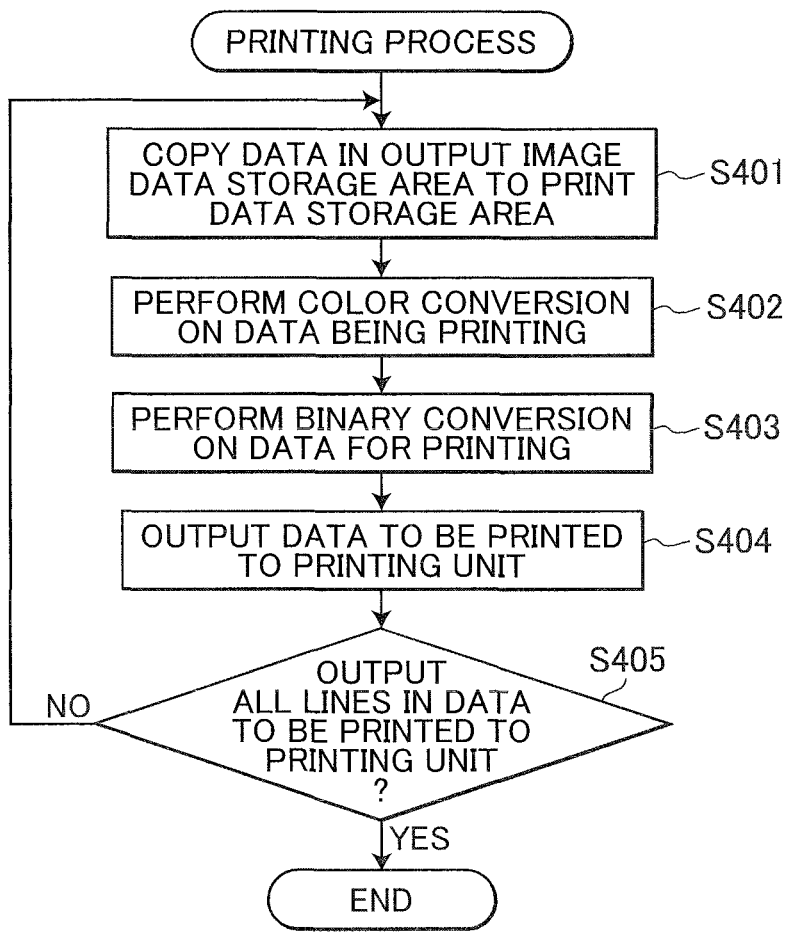
FIG. 16 is a flowchart of a printing process in the media image printing process.

Next, the printing process (process (4) described above) executed in S116 of the media image printing process will be described with reference to a flowchart in FIG. 16. The printing process is executed on the output image data generated and stored in the output image data storage area 33 in S115.

In S401 at the beginning of the printing process, the CPU 14 copies one line worth of the output image data stored in the output image data storage area 33 to the print data storage area 37. If the size of the output image is 1600 pixels horizontally× 1200 pixels vertically, for example, one line would be 1600×1 pixels.

In S402 the CPU 14 performs color space conversion for converting pixel data in the print data storage area 37 from ROB values to CMYK values. More specifically, the CPU 14 performs an RGB→CMY conversion on the pixel data using a color conversion method well known in the aft, and performs CMY→CMYK conversion on the resulting data using a GCR process well known in the art.

In S403 the CPU 14 converts the pixel data in the print data storage area 37 to binary data for printing in each of the CMYK colors. This binary conversion is performed using processes well known in the art, such as the error diffusion method and dither matrix method.

In S404 the CPU 14 outputs the binary data produced in S403 to the printing unit 18, whereby the printing unit 18 performs a printing operation based on this binary data.

In S405 the CPU 14 determines whether the above process has been completed for all lines of the output image data. In the present embodiment, the line counter having an initial value of 0 has been prestored in the temporary variable storage area 38. The CPU 14 increments this line counter by one each time the process described above has been completed for one line. The CPU 14 determines whether the process has been completed for all lines of the output image data when the value of the line counter reaches the number of lines of the output image data stored in the output image data storage area 33.

The CPU 14 returns to S401 when determining in S405 that there remain lines to be processed (S405: No).

When the process has been completed for all lines (S405: YES), the CPU 14 ends the current printing process.

As described above, the MFP 10 according to the present embodiment displays the selection screen 81 with which a user can select an image file to print. The MFP 10 displays images in the selection screen 81 for selecting image files that are candidates for printing. The displayed images give the user a good idea of what the actual printed image will look like if the image file is selected. Accordingly, the user of the MFP 10 can more effectively select image files to obtain desired printed images.

In other words, if only a thumbnail image of one frame image from the motion image file were displayed, this frame image may differ from the image that the user will actually be printing. Hence, the user must select an image file without knowing exactly what image is available for printing in the motion image file. Thus, in some cases the user will not find a desired printed image in the selected image file and must search through several image files in an effort to find the desired image. The MFP 1 according to the present embodiment solves this problem by displaying images the same as print images in the selection screen 81 for selection.

Further, since the MFP 10 of the present embodiment can print an image in which a plurality of frame images has been laid out on the same page, the MFP 10 is configured to display an image having a combination of frame images as a thumbnail image for selection. Arranging a plurality of frame images on a single page also enables the user to more easily identify the content of a motion image than when only one frame image of the motion image is displayed as a selectable image. Printing a plurality of images on a single page is more suited to motion images than still images, particularly when the frame images of the motion image are smaller in size than the still images, since frame images of a motion image may appear grainy and poorer in quality when printed at an enlarged size.

Further, according to the MFP 10 of the present embodiment, a thumbnail image of each frame image, which will be laid out in a thumbnail image of an output image, is displayed before the thumbnail image of the output image itself is displayed, at a size larger than that of the frame image that is displayed when laid out in the thumbnail image of the output image. Hence, the user can confirm contents of each frame image in detail before actually printing.

Specifically, the MFP 10 displays thumbnail images of a plurality of frame images sequentially at predetermined time intervals, and subsequently displays a thumbnail image of an output image in which the plurality of frame images are arranged. With this configuration, a thumbnail image of each frame image can be displayed as large as possible within a prescribed (limited) display region in the selection screen 81.

In other words, in order to display a plurality of frame images and an output image simultaneously, there may be a need to arrange each image such that no part of the images would overlap with one another (between frame images, or between a frame image and the output image). As a consequence, the more the number of frame images there exists in each output image, the smaller the size of each frame image will be for user's visual identification. To the contrary, the MFP 10 according to the present embodiment can display the plurality of frame images sequentially at predetermined time intervals, and subsequently display an image based on the print image, thereby eliminating the above drawback.

Further, thumbnail images of a plurality of frame images are sequentially displayed in an order to be laid out in an output image. Hence, the user can confirm contents of each frame image in consideration of the layout of each frame image in an output image.

In particular, the plurality of frame images are extracted one frame image by one frame image from a motion image file, and the thumbnail images of the extracted frame images are sequentially displayed in an order the same as the order of extraction. Hence, the user can view the thus sequentially-displayed frame images until all the frame images are extracted and the output image is finally generated as a thumbnail image. The user does not have to waste time.

Further, the MFP 10 of the present embodiment sequentially displays thumbnail images of a plurality of frame images, which will be laid out in an output image, by placing a succeeding frame on a preceding frame (overwriting the existing frame image) within a prescribed single display region at which the output image is supposed to be displayed. Hence, the user can intuitively capture correlation between the thumbnail images of the frame images and the thumbnail image of the output image.

Further, since the MFP 10 of the present embodiment displays a row of thumbnail images for a plurality of image files in the selection screen 81 as selectable images, the user can compare output images of different image files when selecting an image file to print. In particular, the MFP 10 of the present embodiment can also allow the user to select an image file to be printed from among a combination of motion image files and still image files. This eliminates the inconvenience of having to select motion image files and still image files using different modes when both file types are stored on the same media card.

While the present invention has been described in detail with reference to the embodiment thereof, it would be apparent to those skilled in the art that various changes and modifications may be made therein without departing from the spirit of the invention.

For example, the MFP 10 according to the present embodiment described above automatically identifies nine frame images to be extracted from a motion image file, but the present invention is not limited to this configuration. For example, the MFP 10 may prompt the user to select which frame images are to be extracted. Further, the number of frame images to be extracted from a motion image file is not limited to nine and need not be fixed to any specific number. The user may be prompted to specify the number of frame images to be extracted.

Further, the MFP 10 of the present embodiment extracts nine frame images from a motion image file in chronological order, and lays out and prints these extracted frame images in the same order (i.e., in their order of extraction). However, as a variation, frame images may be extracted or laid out regardless of their chronological order in the motion image. Note that, displaying the frame images in chronological order as in the present embodiment is more advantageous in that the user can intuitively grasp the flow in the motion image file.

Further, in the above-described embodiment, the MFP 10 displays, in the selection screen 81, a thumbnail image of a print image for a motion image file, after displaying thumbnail images of frame images included in the print image. However, alternatively, the MFP 10 may be configured to display a print preview before executing the printing process. In this process of print preview display, the MFP 10 may display the frame images included in the print image sequentially, before displaying the print image itself as the print preview.

Further, the present invention has been applied to a multifunctional peripheral as an example of printing devices according to the present embodiment, but the present invention may also be applied to a printing device other than a multifunctional peripheral, such as a printer without scanning function.

Further, the present invention may also be applied to a computer connectable with a printing device. In this case, a driver program for controlling operations of the connected printing device is installed on a ROM, an HDD or the like in the computer. By executing the driver program, the computer performs the above-described processes (1) to (4), just like the MFP 10. That is, the computer reads image files (motion image files and still image files) from a media card inserted in the computer, generates an output image for each image file, displays thumbnail images of frame images extracted from each image file and a thumbnail image of the output image on a display unit of the computer for selection, and controls the printing device to print an output image corresponding to the thumbnail image selected by a user. The driver program may be originally stored on a recording medium, such as a CD-ROM, and installed on the computer.

What is claimed is:

1. A printing device comprising:
a processor; and
an instruction memory storing computer-readable instructions therein, the computer readable instructions, when executed by the processor, causing the printing device to perform:
retrieving an image file representing a motion image, the motion image including
one frame image, at least one intermediate frame image and another frame image, chronologically consecutive with one another in the recited order;
extracting a plurality of frame images including the one frame image and the another frame image from the image file without extracting the at least one intermediate frame image from the image file,
for each of the plurality of extracted frames including the one frame image and the another frame image:
converting the extracted frame image to a predetermined size and displaying the converted extracted frame image at the predetermined size on a display unit of the printing device;
laying out the extracted frame image on a page; and
wherein a subsequent frame image is extracted from the image file after the converted extracted frame image is displayed and the extracted frame image is laid out;
wherein each of the plurality of extracted frame images are laid out on a same page,
wherein each of the plurality of converted extracted frame images is displayed sequentially at predetermined time intervals and without displaying the at least one intermediate frame image, the plurality of converted extracted frame images including one converted extracted frame image and another converted extracted frame image,
generating a first output image in which the plurality of extracted frame images including the one frame image and the another frame image are laid out on the same page as a single output image;
displaying, on the display unit of the printing device, the first output image after the plurality of converted extracted frame images are displayed, and the display of the one converted extracted frame image being switched to display of the another converted extracted frame image as a next display, the one converted extracted frame image being displayed in a same position as-the another converted extracted frame image; and
printing the first output image.

2. The printing device according to claim 1, wherein the plurality of converted extracted frame images are displayed in an order in which the plurality of extracted frame images are laid out in the first output image.

3. The printing device according to claim 1, wherein each of the plurality of converted extracted frame images is displayed at a display position where the first output image itself is displayed.

4. The printing device according to claim 1, wherein the plurality of frame images are extracted one frame image by one frame image from the image file to generate the first output image, and the plurality of converted extracted frame images are displayed sequentially in an order that is the same as the order of extraction of the frame images.

5. The printing device according to claim 1, wherein at least one image file representing at least one motion image is retrieved and, a first output image is generated and displayed for each of the at least one image file in a selection screen on the display unit;
wherein the computer-readable instructions further cause the printing device to perform selecting one image file from among the at least one image file whose first output image is displayed in the selection screen, and printing the first output image represented by the one image file selected in the selection screen; and wherein in the selection screen, each of the plurality of converted extracted frame images is displayed before displaying the first output image itself.

6. The printing device according to claim 1, wherein at least one image file each representing either one of a motion image and a still image is retrieved; and
wherein the computer-readable instructions further cause the printing device to perform identifying which of a motion image and a still image is represented by one of the at least one image file, generating, for an image file that is identified to represent a still image, a second output image in which the still image is laid out on a single page and displaying the second output image.

7. The printing device according to claim 6, wherein, when at least one image file representing at least one motion image and at least one image file representing at least one still image file are retrieved, at least two among the at least one first output image and the at least one second output image are displayed as being arranged adjacent to one another in a selection screen on the display unit.

8. The printing device according to claim 1, wherein the first output image is displayed at the predetermined size.

9. A non-transitory computer-readable medium storing computer-readable instructions for a computer, wherein the computer-readable instructions, when executed by a processor of the computer, causes the computer to perform:
retrieving, one image file representing a motion image, the motion image including one frame image, at least one intermediate frame image and another frame image, chronologically consecutive with one another in the recited order;
extracting a plurality of frame images including the one frame image and the another frame image from the one image file without extracting the at least one intermediate frame image from the image file;
for each of the plurality of extracted frames including the one frame image and the another frame image:
converting the extracted frame image to a predetermined size and displaying the converted extracted frame image at the predetermined size on a display unit of the computer;
laying out the extracted frame image on a page; and
wherein a subsequent frame image is extracted from the one image file after the converted extracted frame image is displayed and the extracted frame image is laid out,
wherein each of the plurality of extracted frame images are laid out on a same page, wherein each of the plurality of converted extracted frame images is displayed sequentially at predetermined time intervals and without displaying the at least one intermediate frame image, the plurality of converted extracted frame images including one converted extracted frame image and another converted extracted frame image, generating a first output image in which the plurality of extracted frame images including the one frame image and the another frame image are laid out on the same page as a single output image;

displaying, on the display unit of the computer, the first output image after the plurality of converted extracted frame images are displayed, the display of the one converted extracted frame image being switched to display the another converted extracted frame image as a next display, the one converted extracted frame image being displayed in a same position as the another converted extracted frame image; and controlling a printing device to print the first output image.

10. The non-transitory computer-readable medium according to claim 9, wherein the plurality of converted extracted frame images are displayed in an order in which the plurality of extracted frame images are laid out in the first output image.

11. The non-transitory computer-readable medium according to claim 9, wherein each of the plurality of converted extracted frame images is displayed at a display position where the first output image is displayed.

12. The non-transitory computer-readable medium according to claim 11, wherein the first output image is displayed at the predetermined size.

13. The non-transitory computer-readable medium according to claim 9, wherein at least one image file representing at least one motion image is retrieved and, a first output image is generated and displayed for each of the at least one image file in a selection screen on the display unit, the computer-readable instructions further cause the computer to perform selecting one image file from among the at least one image file whose first output image is displayed in the selection screen, the printing prints the first output image represented by the one image file selected in the selection screen, wherein the displaying displays the plurality of converted extracted frame images in the selection screen before displaying the first output image itself.

14. The non-transitory computer-readable medium according to claim 9, wherein the computer-readable instructions further cause the computer to perform:

retrieving at least one image file, each representing either one of a motion image and a still image;

identifying which of a motion image and a still image is represented by one of the at least one image file;

generating, for an image file identified to represent a still image, a second output image in which the still image is laid out on a single page; and displaying the second output image.

15. The non-transitory computer-readable medium according to claim 14, wherein, when at least one image file representing at least one motion image and at least one image file representing at least one still image file are retrieved, at least two among the at least one first output image and the at least one second output image are displayed as being arranged adjacent to one another in a selection screen.

16. The non-transitory computer-readable medium according to claim 9, wherein the computer-readable instructions, when executed by the processor of the computer, further cause the computer to perform:

retrieving a plurality of image files, each representing a motion image, wherein, the extracting of the plurality of frame images, the converting of each extracted frame image to a predetermined size, laying out the extracted frame image on a page, sequential displaying of each of the plurality of converted extracted frame images at the predetermined time, generating the first output image, and displaying of the first output image after the plurality of converted extract frame images are displayed, are performed for each of the plurality of image files;

wherein the computer-readable instructions, when executed by the processor of the computer, further cause the computer to perform:

selecting one image file from among the plurality of image files whose first output images are displayed on the display unit;

after selecting the one image file, repeating the display of, for the selected image file, the plurality of converted extracted frame images for confirmation; and controlling a printing device to print the first output image for the selected image file.

* * * * *